United States Patent [19]

Schneider et al.

[11] Patent Number: 4,892,254

[45] Date of Patent: Jan. 9, 1990

[54] AIRCRAFT ENGINE INTERFACE FAIRING SUPPORT

[75] Inventors: Raymond P. Schneider, Lake Park; Ronald C. DuPont, Stuart, both of Fla.; Michael J. Dickman, Hanover, N.H.

[73] Assignee: United Technologies Corporation, Hartford, Conn.

[21] Appl. No.: 165,954

[22] Filed: Mar. 9, 1988

[51] Int. Cl.⁴ ............................................. B64C 15/06
[52] U.S. Cl. ......................... 239/265.41; 239/265.33; 239/265.39; 60/242
[58] Field of Search ................. 239/265.39, 265.31, 239/265.33, 265.19; 60/242

[56] References Cited

U.S. PATENT DOCUMENTS

| 2,972,226 | 2/1961 | Geary | 60/35.6 |
| 2,984,068 | 5/1961 | Eatock | 239/265.39 X |
| 3,712,547 | 1/1973 | Smale et al. | 239/265.39 |
| 3,792,815 | 2/1974 | Swavely et al. | 239/265.39 |
| 4,022,948 | 5/1977 | Smith et al. | 428/542 |
| 4,456,178 | 6/1984 | Jones et al. | 239/265.39 |

*Primary Examiner*—Andres Kashnikow
*Assistant Examiner*—Patrick N. Burkhart
*Attorney, Agent, or Firm*—Edward L. Kochey, Jr.

[57] ABSTRACT

An actuator positioning convergent/divergent nozzle flaps is supported from a stiffner on a support structure. An interface fairing for separating possible hot gas flow from engine fumes is supported from the support structure at a location which avoids fairing deflecting as a function of stiffner deflection. Interference between the fairing and nozzle flap drive is thereby avoided.

4 Claims, 2 Drawing Sheets

AIRCRAFT ENGINE INTERFACE FAIRING SUPPORT

TECHNICAL FIELD

The invention relates to aircraft gas turbine engines and in particular to sealing of hot gases from the engine compartment fumes.

BACKGROUND

The augmentor duct of a gas turbine engine conveys hot gas in the order of 2500 F. temperature. This is often passed through variable convergent divergent nozzles to discharge. Even with seals at the interface of the flaps of the nozzle some hot gas may leak out.

Fuel fumes from the engine compartment can create explosion potential within the aircraft structure. Attempts have therefore been made to provide additional sealing between the hot gas and the engine compartment.

Weight is a serious concern in an aircraft engine. It accordingly is desirable to use lightweight structure. Such lightweight fairing structure may be easily deformed to the point that it interferes with the nozzle flap drive. This interference may disable the drive or may further deform the fairing structure to allow the leakage which it was intended to prevent.

SUMMARY OF THE INVENTION

A gas turbine engine located within an aircraft engine compartment has an augmentor duct carrying hot gas to a plurality of convergent nozzle flaps forming an adjustable convergent nozzle. A sync ring connected to the nozzles is driven by an actuator for the purpose of adjusting the position of the nozzles. The static support structure is supported from the augmentor duct with a cylindrical stiffner at the upstream end. The actuator is structurally connected to the stiffner thereby transmitting actuation forces into the stiffner.

A cylindrical lightweight fairing surrounds the support structure from the stiffner location to the point of connection of the sync ring to the nozzle flaps. A plurality of finger seals located on the stiffner are sealingly biased against the fairing. The fairing itself is supported from the support structure at a particular support location. This location is upstream of the travel of the sync ring and downsteam of the stiffner.

Preferably the support structure is fully cylindrical at both the stiffner location and the support location but is substantially slotted therebetween. Accordingly, deflection of the stiffner caused by the actuator loads has minimal effect on the lightweight fairing thereby avoiding distortion thereof.

DESCRIPTION OF THE PREFERRED EMBODIMENT

Figure 1:
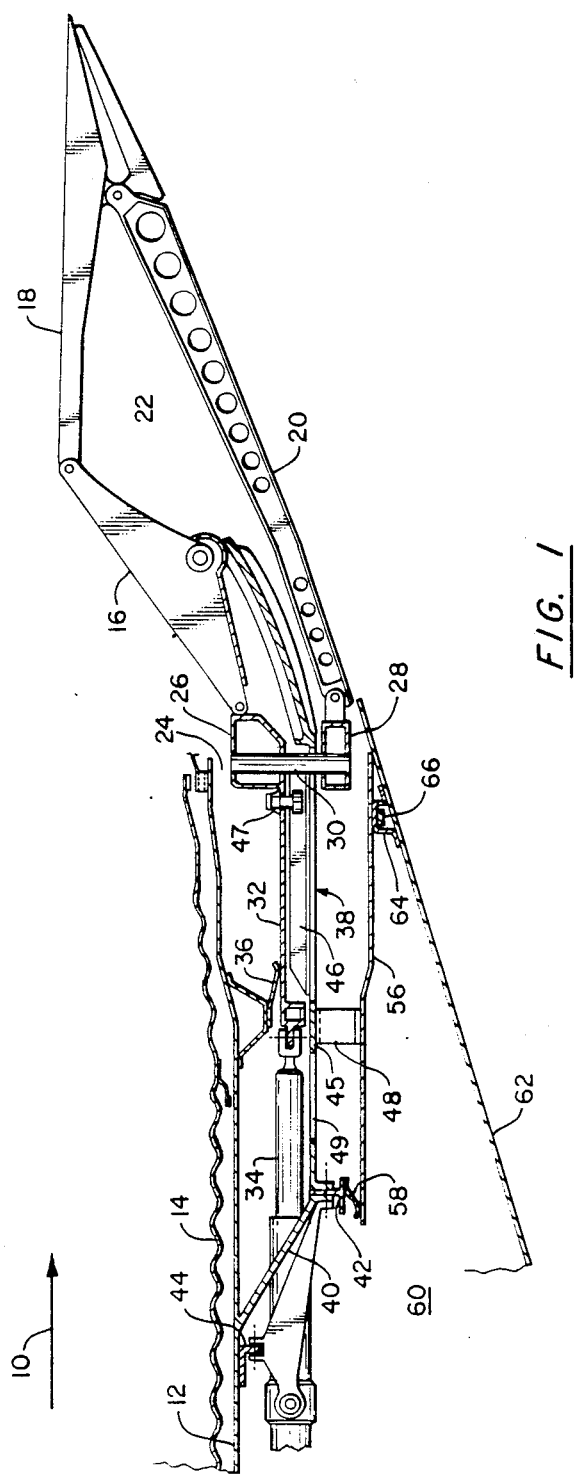
FIG. 1 is a one-half sectional elevation through the nozzle and fairing of a gas turbine engine.
Figure 2:
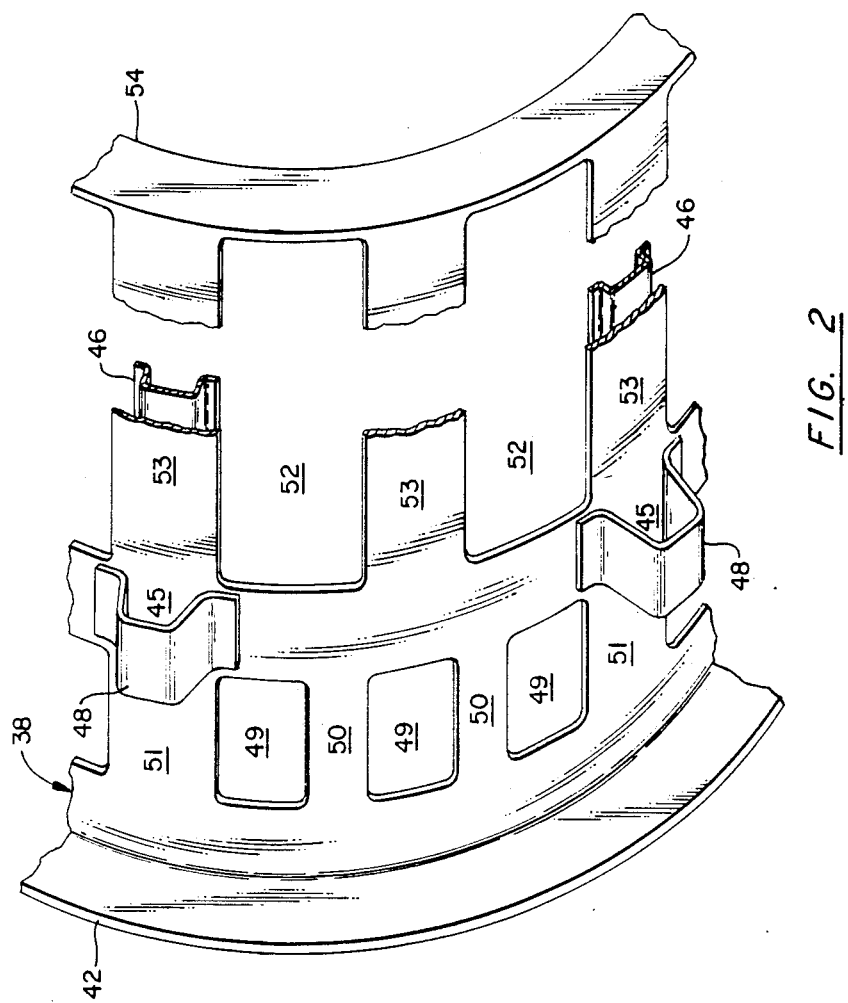
FIG. 2 is a perspective section of the static support structure.

Hot gas 10 from a gas turbine engine passes through an augmentor duct 12 which has an internal augmentor duct liner 14. It then passes through a convergent nozzle formed of a plurality of convergent nozzle flaps 16 and a divergent nozzle formed of a plurality of divergent flaps 18. There is also associated with these flaps an external flap 20.

Even with seals between adjacent flaps hot gases may leak into the nozzle flap chamber 22 as well as backwardly through opening 24.

An inner sync ring 26 is pivotally connected to the convergent nozzle flaps and an outer sync ring 28 is pivotally connected to the external flaps. These two rings are connected together with 12 spokes 30 so that they act in unison in positioning the flaps. An impervious sync ring cylinder 32 connects the sync ring to three actuators 34. These actuators move the sync ring from the extended position as illustrated to a withdrawn position farther to the left. A seal 36 is biased against the sync ring cylinder and secured to the augmentor duct to avoid upstream passage of hot gas through this area.

A static support structure 38 is secured to augmentor duct 12 through a conical support 40 and a channel member or stiffner 42 is located at the upstream end of the static support structure. Actuator 34 transfers most of its actuating load to the stiffner 42 with a portion going to guide member 44. The actuator is sealed to conical support 40 where it passes through the cone. Support structure 38 also includes a sync ring guide 46 track at each actuator location which interacts with guide pins 47 of the inner sync ring to provide stability.

At the upstream end of the static support structure in the area of stiffner 42 the support structure is a full cylinder. A full cylinder area also exists at the support location 45 of support brackets 48. Between these two full cylindrical areas there is a zone with a plurality of slots 49, each covering an arc of 11.5 degrees. Between these openings are arcuate segments 50 of 6.5 degrees and arcuate segments 51 of 12.5 degrees. Preferably this arc of material should not exceed 15 degrees, this being a compromise between the longitudinal strength required, and flexibility required to minimize diametric deformation from the strain of stiffner 42.

Aft of the brackets 48 are a plurity of 17.5 degree openings 52 and 12.5 degree arcuate segments 53 extending to stiffner 54. Tracks 46 are substantially in line with brackets 48 providing stiffening of segments 53. Thus, deformation of stiffner 42 has a minimal effect on deformation of support location 45.

The support brackets 48 secured to the static support structure at support location 45 in turn support the lightweight interface fairing 56. The fairing passes from an upstream location near the stiffner member 42 to a location downstream of the extreme downstream travel of the sync ring 28.

A plurality of outwardly based finger seals 58 are sealingly secured to the stiffner 42 and seal against the interface fairing 56. Engine compartment 60 is thereby effectively sealed from the hot gas 10. Also shown are air frame turkey feathers 62 which are guided by lug 64 secured to strap 66 of the interface fairing. It can therefore be seen that the hot gases not only cannot reach the engine compartment but the fumes from the engine compartment will not reach the flap plenum 22 where they could explosively mix with the hot gases.

The loads from actuator piston on stiffner 42 will cause the stiffner to deflect a considerable amount. This is structurally acceptable from the allowable stress and fatigue standpoint. Further increasing the strength of the stiffner would add weight to the aircraft unnecessarily. Connecting the interface fairing 56 to the stiffner would cause the deflection of the stiffner to be transferred into the lightweight fairing thereby moving the downstream end of the fairing into possible contact with portions of the sync ring either causing the flap actuation to become inoperative or to completely buckle the fairing.

Stiffening the fairing in an attempt to avoid this also adds unnecessary weight to the plane. Therefore, the fairing is supported from support location 45 at a location downstream of the stiffener but upstream of the travel of the sync ring so that deflection of the stiffener does not affect the interface fairing. This movement is further minimized by providing the appropriate flexibility with slots 49 thereby further minimizing any deflection of the interface fairing.

We claim:

1. In a gas turbine engine within an aircraft engine compartment an apparatus comprising:
    an augmentor duct conveying hot exhaust gas;
    a plurality of convergent nozzle flaps forming an adjustable convergent nozzle receiving gas from said augmentor duct;
    a plurality of external flaps surrounding said convergent nozzles in spaced relationship forming a flap chamber therebetween;
    a sync ring pivotally connected to said convergent nozzle and said external nozzle for adjusting the position of said nozzles;
    a static support structure circumferentially surrounding said augmentor duct, the upstream end of said support structure supported from said augmentor duct, a cylindrical stiffener at the upstream end of said support structure;
    an actuator supported at least in part from said stiffener and connected to said sync ring for providing an axial travel of said sync ring;,
    a cylindrical impervious lightweight fairing surrounding said support structure from said stiffener location to the location of the connection of said sync ring to said nozzle flaps;
    a plurality of finger seals located on said stiffener and sealingly biased against said fairing, whereby fumes from said engine compartment may not enter the space inside said fairing; and
    said fairing supported from said support structure at a support location on said support structure;
    said support location being upstream of the travel of said sync ring and downstream of said stiffener.

2. An apparatus as in claim 1:
    said support structure being a full cylinder at both the upstream end and the support location, and being a segmented cylinder between said upstream end and said support location.

3. An apparatus as in claim 2:
    said segmented cylinder having arcuate segments not exceeding 15 degrees.

4. An apparatus as in claim 2: internal tracks secured to said support structure downstream of and substantially axially aligned with said support location.

* * * * *